April 5, 1938.  H. WIEGAND  2,113,149
VALVE GEAR
Filed April 13, 1937
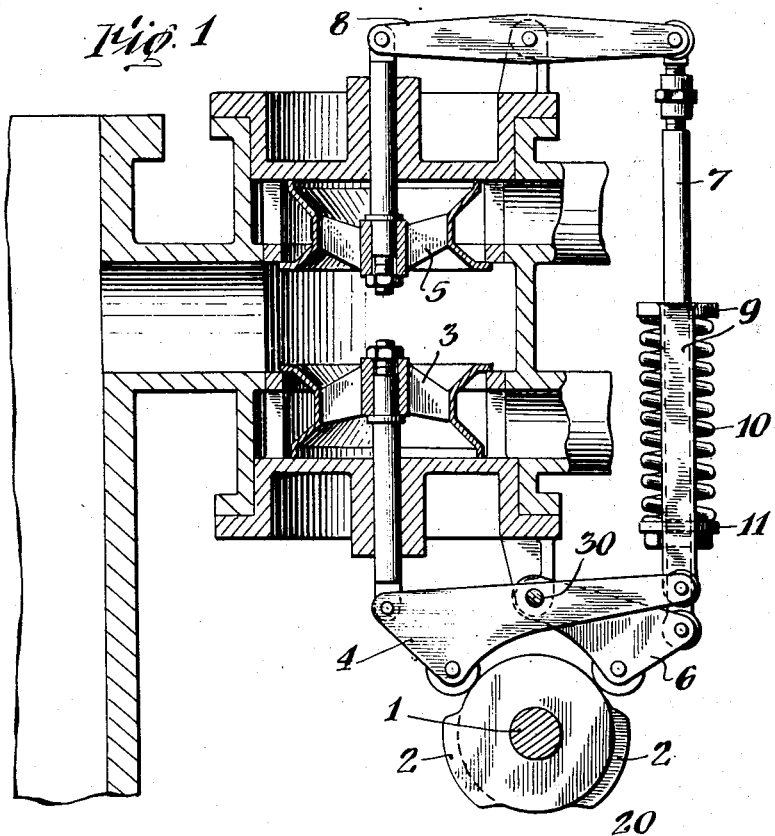
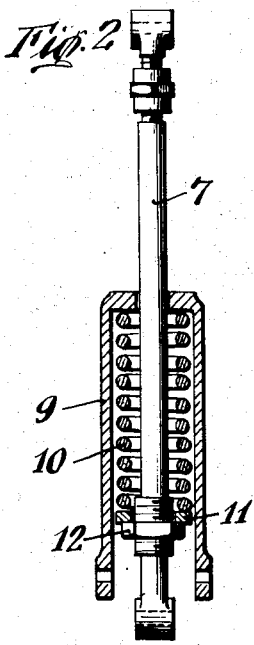
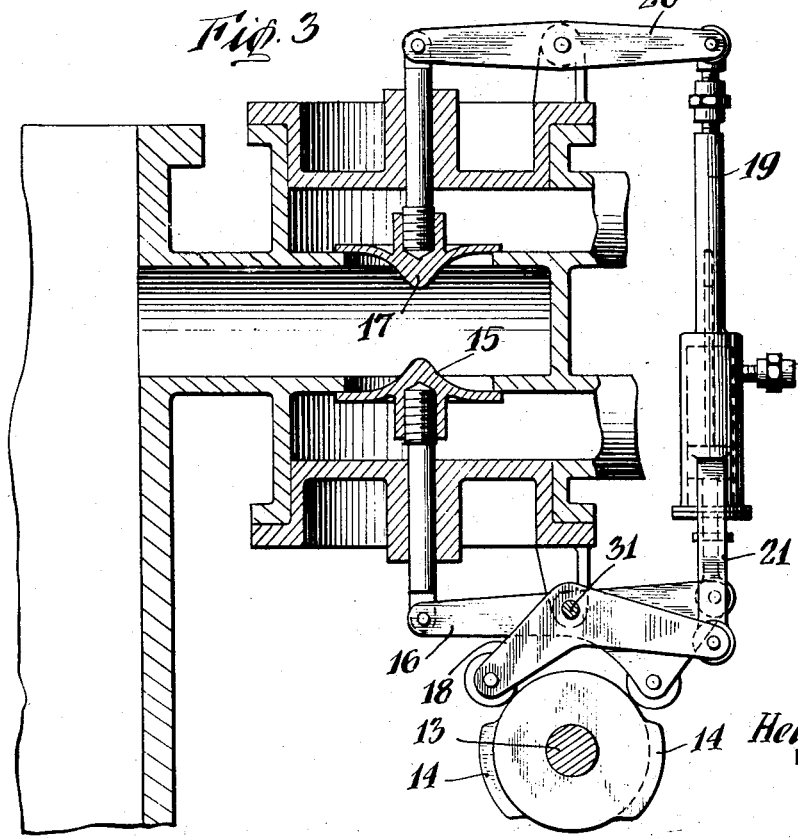
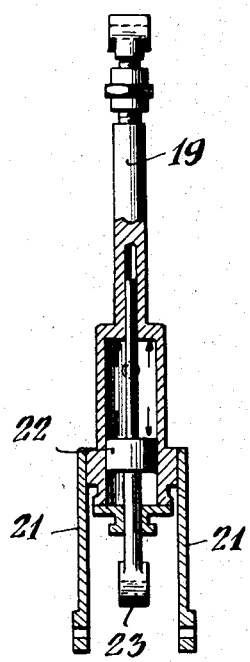
INVENTOR
Hellmuth Wiegand
BY
O. V. Thiele
ATTORNEY Patented Apr. 5, 1938

2,113,149

UNITED STATES PATENT OFFICE 2,113,149

VALVE GEAR

Hellmuth Wiegand, Berlin-Lichtenrade, Germany, assignor to Willy Salge & Co., Technische Gesellschaft, Berlin, Germany Application April 13, 1937, Serial No. 136,529
In Germany March 26, 1936

4 Claims. (Cl. 121—127)

The present invention relates to mechanism for actuating valves of the poppet type in reciprocating engines, particularly those using highly superheated and high pressure steam. The usual gear for actuating such valves includes some means to bias or load the valves or some connected element so the valves are urged resiliently toward closed position. In prior gears of the general type to which the present invention relates, there was either a separate loading or biasing member or element for each valve, or there was a single member of this kind for the two valves at each end of the cylinder, such member in either case being a spring or a pressure cylinder arranged coaxially with the valve. There were in the prior art valve-closing means common to the two valves at the same end of the cylinder but these means lie inside of the valve chest and are in all cases exposed to the steam temperatures. They further have the disadvantage that the closing force is not adjustable. In addition their relatively great length, and the difficulty of access were serious drawbacks. This was particularly true in those cases where the four valves were arranged in alinement.

In the case of the present invention, two juxtaposed valves have common closing means, whose force is exerted on both valves at the same time by means of rods and levers.

As compared with prior devices of this sort the construction herein proposed has the following advantages:

The parts are all readily accessible.
Inspection and adjustment are very easy.
The undesirable effects of heat radiation and conduction on the valve closing members are greatly reduced.

The valve rods are simple and the valve closing means are incorporated in the valve actuating gear. The valve rods therefore do not need to be given the large dimensions required in prior constructions where they served to accommodate the valve closing member, which was a spring or a pressure cylinder.

In the drawing two illustrative examples of the invention are shown. Fig. 1 shows an arrangement of such a gear comprising a spring, the two valves being double-seated and opening in a direction toward each other, one of them being the inlet valve and the other the exhaust valve. The spring tending to close the valves in this case is arranged around the push rod which acts from the outside to open one of the valves. Fig. 2 is a lateral elevation of Fig. 1 viewed from the right.

Fig. 3 shows an arrangement of a pressure cylinder used as the closing means for two valves, which in this case open in a direction away from each other. Fig. 4 is the corresponding lateral elevation of Fig. 3 viewed from the right.

According to Figs. 1 and 2 the cam shaft 1 with its cams 2 actuates valve 3 by means of the lever 4 and actuates valve 5 by means of the lever 6, the push rod 7 and the lever 8. The two levers 4 and 6 have the common fulcrum 30. The lever 4 has an extension which is pivotally connected to the yoke 9, the end of the yoke furnishing one of the abutments for the spring 10. The opposite abutment for this spring is furnished by the washer 11 which is held adjustably on the push rod 7 by means of the nut 12. The spring 10 exerts its resilient closing power on the alternately actuated valves 3 and 5 through the washer 11 and yoke 9 and the valve rods and gear.

Figs. 3 and 4 show an arrangement of such a gear utilizing a pressure cylinder as the resilient closing force. In this case the cam shaft 13 with its cams 14 acts on the valve 15 by means of the lever 16 and on the valve 17 by means of the lever 18, push rod 19 and lever 20, the levers being mounted on the common fulcrum 31. The lower end of the push rod 19 is given the form of a pressure cylinder to which are secured two tension arms 21 whose ends are pivotally connected to the lever 18. In the pressure cylinder there is mounted reciprocably the piston 22 whose rod 23 is pivotally connected to the lever 16. The pressure fluid is delivered to the cylinder by means of the connection 24.

What I claim is:

1. Valve gear for reciprocating engines having poppet-type valves arranged in a valve chest in axially alined pairs, each pair including an inlet valve and an exhaust valve, the two valves opening in opposite directions; two valve actuating members, a train of elements extending from one of the valves to one of the actuating members, a second train of elements extending from the other valve to the other actuating member, said actuating members being operative through said trains of elements to raise the valves alternately from their seats, and a common valve-closing element engaging one element of each train and resiliently urging the two valves toward their seats, the seating force of said closing element on one valve increasing as the other valve is opened, said trains and valve closing element lying wholly outside of the valve chest.

2. Valve gear in accordance with claim 1, the valves being arranged to open in a direction toward each other.

3. Valve gear in accordance with claim 1, the valves being arranged to open in a direction away from each other.

4. Valve gear for reciprocating engines having poppet-type valves arranged in a valve chest in axially alined pairs, each pair including an inlet valve and an exhaust valve, said gear for each pair of valves comprising a stem for each valve extending out from the valve chest, two levers operatively engaging the two stems respectively, means including a common resilient member acting through said two levers urging the valves to their seats, and means to open the valves alternately in opposition to the resilient member, all of the gear between the two stems lying wholly outside of the valve chest.

HELLMUTH WIEGAND.